(No Model.)

C. H. PHILLIPS & C. J. SEYMOUR.
ELEVATOR AND CONVEYER.

No. 456,518. Patented July 21, 1891.

Witnesses
H Brown
A. D. Harrison.

Inventor
C. H. Phillips
C. J. Seymour,
Per Wright, Brown & Crossley
Attorneys

UNITED STATES PATENT OFFICE.

CHARLES H. PHILLIPS, OF BOSTON, AND CHARLES J. SEYMOUR, OF BROOKLINE, MASSACHUSETTS; SAID PHILLIPS ASSIGNOR TO SAID SEYMOUR.

ELEVATOR AND CONVEYER.

SPECIFICATION forming part of Letters Patent No. 456,518, dated July 21, 1891.

Application filed April 19, 1890. Serial No. 348,642. (No model.)

*To all whom it may concern:*

Be it known that we, CHARLES H. PHILLIPS, of Boston, in the county of Suffolk, and CHARLES J. SEYMOUR, of Brookline, in the county of Norfolk, and State of Massachusetts, have invented certain new and useful Improvements in Elevators and Conveyers, of which the following is a specification.

Our invention relates generally to the devices employed in elevators and conveyers for receiving, carrying, and discharging coal, grain, and the like, and is particularly adapted for use in connection with lines or chains of buckets or buckets and pans.

It is the object of our invention to provide such an improvement in lines or chains of elevating and conveying buckets, or buckets and pans, as will make the portions or parts upon which the sprocket or guide and actuating wheels directly act independent of and removable from other and adjacent parts, so that such independent parts can be made of high-grade wear-withstanding metal and be removed from the axles and be replaced by new parts when necessary without the need of removing and renewing large and costly parts, thus securing economical and convenient ends.

It is also the object of our invention to provide an improvement in devices of the kind mentioned, when composed of buckets and pans alternating one with another, such as will prevent the sides of the pan from spreading when the same is loaded.

Our invention will first be described in connection with the annexed drawings and letters of reference marked thereon, forming a part of this specification, and then be particularly pointed out in the claims appended to the detailed description.

Figure 1:
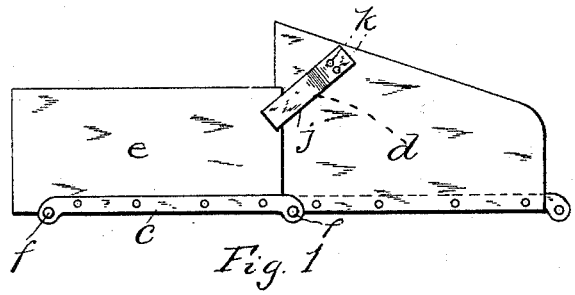
Figure 2:
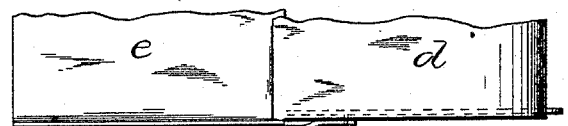
Figure 5:
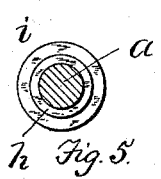
Figure 4:
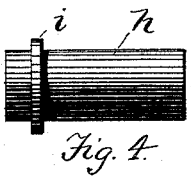
Figure 3:
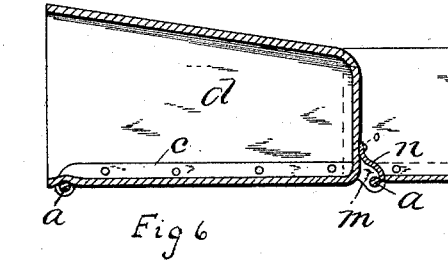
Figure 6:

In the said drawings, Figure 1 is a side elevation of a bucket and pan provided with a part of our invention. Fig. 2 is a top plan view of a portion of a bucket and pan equipped with the part of our invention shown in Fig. 1. Fig. 3 is a plan view of another part of our invention as applied to the axles of a line or chain of buckets, or buckets and pans, and showing also a portion of a sprocket or actuating wheel. Fig. 4 is a side elevation of our improved removable bushing for the axles of a line of buckets or buckets and pans in elevating and conveying contrivances. Fig. 5 is an end view of Fig. 4, showing the axle in section in the bushing. Fig. 6 is a side view of a bucket and pan partially in section, showing another part of our invention.

The same letters of reference designate the same parts or features wherever they occur.

In the drawings, $a$ designates the axle, upon each end of which is a wheel $b$, arranged so as to travel on tracks (not shown) and support and guide the line or chain of buckets or buckets and pans in its travel.

$c$ $c$ designate eye-bars secured to the lower edges of the sides of the buckets $d$ and pans $e$, as is most clearly shown in Fig. 1. The axle $a$ passes through the eyes $f$ of the bars $c$, thus securing a pivotal connection of the latter with the former. The eye-bars $c$ are maintained upon the axle at a sufficient distance inward from the wheels $b$ to permit the sprocket or drive wheels $g$ to engage the axle in order to separate the line. A portion only of a sprocket-wheel $g$ is represented in Fig. 3; but sufficient thereof is shown to make its co-operation with the improvements clear to those skilled in the art.

As a great amount of wear is occasioned by the action of the sprocket-wheels and eye-bars upon the axle, and to obviate the quite considerable cost of repairs arising from the replacement of new axles for worn ones, we provide a steel or other bushing $h$ of high wear-resisting qualities, which we place upon the axle in such position as to form a bearing for the eye-bars $c$, and it may be for the wheels $b$, and so as to surround the axle at the point where the sprocket-wheel engages the same, as will be clearly understood by an inspection of Fig. 3 of the drawings. This bushing $h$, it will be observed, may be readily removed when it becomes worn and a new bushing put in its place at a trifle of the cost of a new axle, and, besides, it enables us to make the axle of comparatively cheap metal and to construct the bushing of high wear-resisting metal, and so render the structure quite lasting.

The bushing $h$ may be provided with a flange $i$ to assist in keeping the eye-bars $c$ in place on the bushing.

In the construction and arrangement of a line of buckets and pans it is usual to make the sides of the latter to overlap the sides of the former at the meeting ends of the two, as is shown in Figs. 1 and 2.

In the operation of elevating the coal or other substance it sometimes happens that the hooded bucket $d$ is filled more than even full, and this surplus substance above the top of the bucket, particularly in passing over the sprocket-wheels just prior to dumping, acts with a tendency to spread the sides of the pan adjacent to the open end of the bucket apart. To avoid this, we provide an arm $j$, which we secure at one end, as at $k$, to the bucket, one upon each side. The arms $j$ are offset, as at $l$, a short distance from the end at which they are attached to the buckets and extend forward and downward, so as to embrace the sides of the pan and prevent the same from spreading by reason of an undue load, as before mentioned, or from other cause. This construction in no way interferes with the operation of the line of buckets and pans, since in the passage of the line over a sprocket or guide wheel the sides of the latter may overlap the sides of the former, as indicated by the dotted line in Fig. 1, and the arm $j$ will still operate to keep the sides of the pan in place.

In the construction of a line of buckets and pans in a way that we find expedient, an open space $m$ is left between the adjacent ends of the buckets and pans, and particularly between the closed end of the bucket and the adjacent end of the pan with which it is connected, through which opening matter intended to be carried by the buckets and pans is liable to fall. To overcome this objection we provide a hood or curtain $n$, consisting of a strip of sheet metal attached at one edge, as at $o$, to the bucket and extending out and downward over the axle $a$, as is best seen in Fig. 6.

The arm $j$, as also other parts of my invention, may be changed in form and arrangement without departing from the nature or spirit of our improvements.

Having thus explained the nature of our invention and described a way of constructing and using the same, we declare that what we claim is—

1. The combination, with the buckets and pans provided with eye-bars secured to their sides, of the axle, the bushing loose on the axle and provided near its inner end with the flange I, the said eye-bars being arranged on the said bushing inside of the said flange, and the wheel $b$ on the outer end of the said bushing, as set forth.

2. The combination, with the hooded bucket $d$ and the pan $e$, having the sides of the end adjacent to the mouth of the bucket arranged to overlap the sides of the latter device, of the arms $j$, offset, as at $l$, secured at one end to the sides of the bucket and extended forward and embracing the sides of the pan.

In testimony whereof we have signed our names to this specification, in the presence of two subscribing witnesses, this 12th day of April, A. D. 1890.

CHARLES H. PHILLIPS.
CHARLES J. SEYMOUR.

Witnesses:
 ARTHUR W. CROSSLEY,
 A. D. HARRISON.